US012639969B2

(12) United States Patent
Azad et al.

(10) Patent No.: US 12,639,969 B2
(45) Date of Patent: May 26, 2026

(54) METHODS AND SYSTEMS FOR TESTING AN OPTICAL CHARACTER RECOGNITION MODEL

(71) Applicant: The Boeing Company, Chicago, IL (US)

(72) Inventors: Ali Azad, Kirkland, WA (US); David D. Pokrajac, Everett, WA (US); Amir Sadrpour, Seattle, WA (US); Barnabas Poczos, Pittsburgh, PA (US); Hai Thanh Pham, Pittsburgh, PA (US)

(73) Assignee: THE BOEING COMPANY, Arlington, VA (US)

( * ) Notice: Subject to any disclaimer, the term of this patent is extended or adjusted under 35 U.S.C. 154(b) by 773 days.

(21) Appl. No.: 17/983,557

(22) Filed: Nov. 9, 2022

(65) Prior Publication Data

US 2024/0153295 A1 May 9, 2024

(51) Int. Cl.
*G06V 30/19* (2022.01)
*G06V 30/148* (2022.01)

(52) U.S. Cl.
CPC ........ *G06V 30/1914* (2022.01); *G06V 30/158* (2022.01)

(58) Field of Classification Search
None
See application file for complete search history.

(56) References Cited

U.S. PATENT DOCUMENTS

| | | |
|---|---|---|
| 11,176,443 B1 | 11/2021 | Selva et al. |
| 2018/0096200 A1 | 4/2018 | Krivopaltsev et al. |
| 2020/0005071 A1* | 1/2020 | Kim ..................... G06N 3/0464 |
| 2021/0166093 A1* | 6/2021 | Laza ................... G06V 30/413 |
| 2021/0319246 A1 | 10/2021 | Xu |
| 2021/0365836 A1 | 11/2021 | Wilkins |
| 2023/0237824 A1* | 7/2023 | Kwok ............. G06V 30/19067 |
| | | 382/181 |
| 2024/0153295 A1* | 5/2024 | Azad .................... G06V 30/158 |
| 2025/0166404 A1* | 5/2025 | Kogan .................. G06V 30/26 |

OTHER PUBLICATIONS

Luo, C., et al., "MORAN: A Multi-Object Rectified Attention Network for Scene Text Recognition", Pattern Recognition, Jan. 10, 2019, pp. 1-15, vol. 90.

Zhou, X., et al., "EAST: An Efficient and Accurate Scene Text Detector", Proceedings of the IEEE Conference on Computer Vision and Pattern Recognition (CVPR), Jul. 10, 2017, pp. 5551-5560.

(Continued)

*Primary Examiner* — Edward Park

(74) *Attorney, Agent, or Firm* — COATS & BENNETT, PLLC

(57) ABSTRACT

Systems and methods for generating optical character recognition (OCR) models configured to identify characters from a variety of different documents. The OCR models are based on a base model. One or more outside models can be tested to determine their effectiveness in supplementing the base model. When an outside model is effective it is incorporated into the base model. Generations of base models can be created that provide for additional functionality that is not present in the preceding model. A family of the generations of base models is maintained.

20 Claims, 5 Drawing Sheets

(56) References Cited

OTHER PUBLICATIONS

Liu, X., et al., "FOTS: Fast Oriented Text Spotting with a Unified Network", 2018 IEEE/CVF Conference on Computer Vision and Pattern Recognition (CVPR); Jan. 15, 2018, pp. 1-10.
Github, "Tesseract-ocr/tesseract: Tesseract Open Source OCR Engine (main repository)", retrieved from the internet: https://github.com/tesseract-ocr/tesseract [retrieved on Nov. 8, 2022], pp. 1-5.
Python, "Welcome to Python.org"; Retrieved from the internet: URL: https://www.python.org/ [retrieved on May 18, 2022]; pp. 1-3.
Pillow, "Pillow (PIL Fork)", Retrieved from the internet: URL: https://pillow.readthedocs.io/en/stable/ [retrieved on May 18, 2022]; pp. 1-5.
Home-OpenCV, "OpenCV AI Game Show", Retrieved from the internet: URL: https://opencv.org [retrieved on May 18, 2022]; pp. 1-10.
Scikit-Image, "Image processing in Python", Retrieved from the internet: URL: https://scikit-image.org/; pp. 1-2.

* cited by examiner

51

METHODS AND SYSTEMS FOR TESTING AN OPTICAL CHARACTER RECOGNITION MODEL

TECHNOLOGICAL FIELD

The present disclosure relates generally to the field of optical character recognition and, more specifically, to generating an optical character recognition model based on a base model and one or more outside models.

BACKGROUND

There are numerous tools that provide text extraction from documents. These tools utilize optical character recognition (OCR) to identify and extract characters including letters, numbers, words, and/or sentences from an image. This process eliminates the need for manually inputting and analyzing hard copy documents into electronic formats. The OCR documents provide for searching, editing, and formatting as needed without the need for manual entry.

The OCR tools can further include intelligent character recognition that implement more advanced methods of identifying characters in a document. The advanced tools can identify characters in a variety of different documents including but not limited to hand-written documents, poorly-scanned documents, and documents with additional matter such as stamps and stains.

A problem with using the OCR tools is determining their effectiveness when used on documents from a specific source. For example, documents from a particular industry (e.g., airline industry, telecommunications) will include industry-specific words that may not be encountered in other contexts. OCR tools can also have issue in identifying characters from a particular professional field (e.g., medical field, law field, engineering field) that include words that may not be used elsewhere. Evaluating the effectiveness of OCR tools to identify characters in these contexts can be difficult.

Another issue with existing OCR tools is the inability to determine characters when presented in different manners. One example includes characters that is not presented in parallel lines, such as would be encountered in hand-written documents or documents with folds/creases that change the relative orientation of the lines of text. Existing OCR tools may also be limited in identifying characters in a limited fonts or may not be able to identify characters in handwritten documents. Existing OCR tools may also have difficulty identifying characters on documents with artifacts, such as noise, watermarks, and regular patterns that appear on printed forms such as vertical and horizontal lines for charts and for letterhead.

SUMMARY

One aspect is directed to a method of testing an optical character recognition (OCR) model. The method comprises: determining a criteria for improvement of an OCR base model; establishing a communication link through a communications network; downloading through the communications network an outside model that provides an OCR function; obtaining test data comprising control images having predetermined alphanumeric data; testing the outside model with the control images; based on the testing, determining that the outside model increases the criteria of the base model; and selecting the outside model for incorporation with the OCR base model.

In another aspect, the method further comprises incorporating the outside model into the OCR base model and generating a new generation OCR base model.

In another aspect, generating the new generation OCR base model comprises fusing together the OCR base model and the outside model and forming the new generation OCR model.

In another aspect, testing the outside model comprises determining a number of words detected by the outside model in the test data relative to a known number of words in the control images.

In another aspect, testing the outside model comprises determining a number of words detected by the outside model in the control images, and determining how many of the detected words were correctly digitized by the outside model.

In another aspect, the method further comprises selecting the outside model from a group of open-source models that are accessed through the communications network.

In another aspect, the method further comprises testing the outside model on the control images that comprise images of industry-specific documents.

In another aspect, the OCR base model is configured to search and identify word images in an image document and recognize the identified words and produce a string of corresponding alphanumeric characters.

In another aspect, the criteria comprises at least one of: identifying word images from tables in the control images; identifying word images of from handwritten characters in the control images; and identifying terms in the control images that are covered by stains.

In another aspect, the method further comprises after generating the new generation OCR base model, maintaining the OCR base model.

In another aspect, the method further comprises maintaining a family that comprises the new generation OCR base model, the OCR base model, and one or more prior generations of OCR base model.

One aspect is directed to a computing device comprising interface circuitry configured to send and receive data through a communications network and processing circuitry operatively coupled to the interface circuitry and configured to: obtain an outside model through the communications network that provides an OCR function; obtain test data that comprises control images with known OCR attributes; test the outside model using the control images and determine a score; when the score is below a predetermined level, determine that the outside model should not be incorporated into a OCR base model; and when the score is above a predetermined level, generate a new generation base model that comprises the outside model and a base model.

In another aspect, the processing circuitry is configured to obtain the test data without accessing an IP network of the communications network.

In another aspect, the processing circuitry is further configured to determine a weakness criterion for improvement of the OCR base model and determine that the weakness criterion is improved by the outside model based on the score.

In another aspect, the outside model is an open-source model.

In another aspect, the processing circuitry is further configured to determine that the outside model improves a weakness criteria of the OCR base model.

In another aspect, the weakness criteria comprises at least one of identifying word images from tables in the control images, identifying word images of from handwritten characters in the control images, and identifying terms in the control images that are covered by stains.

In another aspect, the processing circuitry is further configured to store a family comprising the OCR base model and previous generations of the OCR base model.

One aspect is directed to a non-transitory computer readable medium storing a computer program product for controlling a programmable computing device with the computer program product comprising software instructions that, when executed on processing circuitry of the programmable computing device, cause the processing circuitry to: establish a communication link through a communications network; download through the communications network an outside model that provides an OCR function; obtain test data comprising control images having predetermined alphanumeric data; test the outside model with the control images; based on the testing, determine that the outside model improves at least one criteria of an OCR base model; and select the outside model for incorporation with the OCR base model.

In another aspect, the processing circuitry is further configured to determine a criterion for improvement of the OCR base model.

The features, functions and advantages that have been discussed can be achieved independently in various aspects or may be combined in yet other aspects, further details of which can be seen with reference to the following description and the drawings.

DETAILED DESCRIPTION

The present application is directed to the generation of optical character recognition (OCR) models configured to identify characters from a variety of different documents. The OCR models are based on a base model. One or more outside models are tested to determine their effectiveness in supplementing the base model. When an outside model is effective it is incorporated into the base model. Generations of base models can be created that provide for additional functionality that is not present in the preceding model. A family of the generations of base models is maintained.

Figure 1:
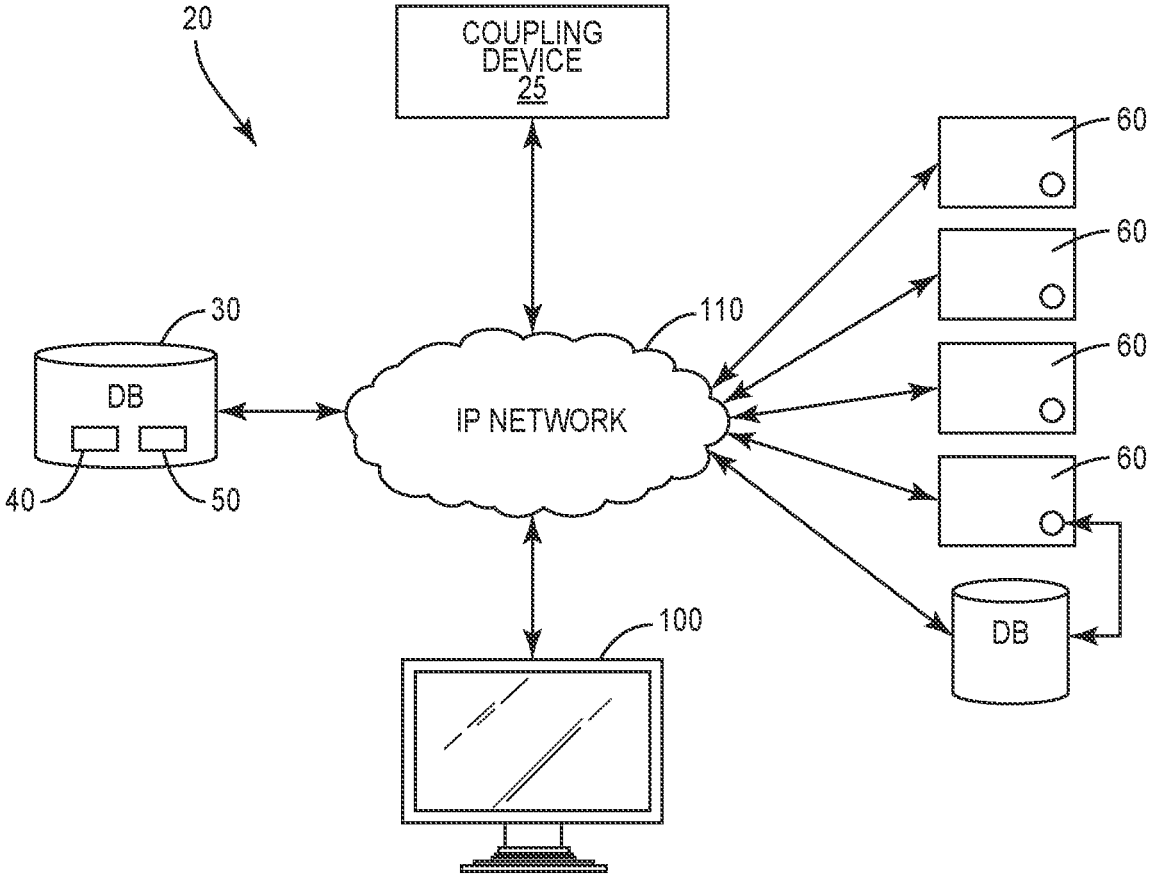
FIG. 1 is a schematic diagram of a communications network.

FIG. 1 illustrates an example communications network 20 according to one or more such aspects. The example communications network 20 includes a computing device 100 operatively connected to a database 30. The database 30 contains test data 40 and one or more OCR base models 50. The computing device 100 is further operatively connected to outside OCR models 60 through a network 110. As will be discussed in greater detail below, the computing device 100 is configured to perform text recognition based on the test data 40 using one or more of the outside models 60. The computing device 100 determines the effectiveness of the one or more outside models 60 and incorporates those that are effective into the base model 50. The incorporation of the base model 50 and the one or more outside models 60 creates a new generation of the base model 50. The various generations of base models 50 are maintained and can be stored in the database 30.

Figure 2:
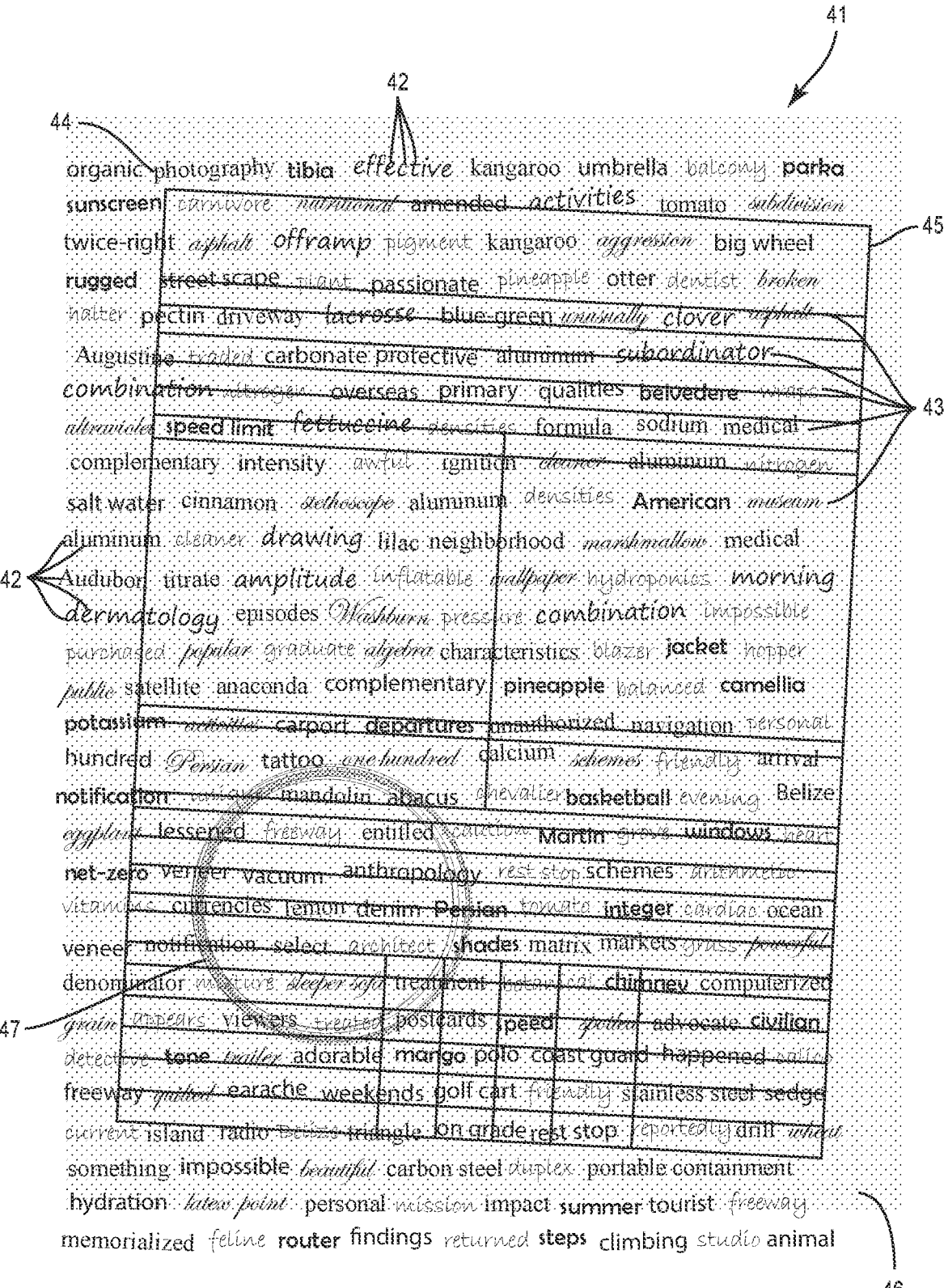
FIG. 2 is a diagram of a control image used for testing an outside model.

The test data 40 includes control images 41 as illustrated in FIG. 2. The number of control images 41 stored in the database 30 can vary. The control images 41 include scanned documents that include various characters 42 that combine together to form one or more terms 43. The terms 43 can be isolated, or can be combined together to form words, phrases, sentences, etc. The terms 43 can also include abbreviations and acronyms that are used in practice. FIG. 2 illustrates a training document that includes terms 43 positioned at various locations and orientations. The characters 42 can have the same or different visual appearance due to the same or different sizes, orientations, fonts, colors, etc.

The control image 41 further includes a background 44 on which the characters 42 appear. The background 44 can include various visual appearances. The background 44 can include various aspects, including but not limited to grid/table lines 45 and shaded areas 46. The control image 41 can include noise 47 such as but not limited to stains, stamps, and folded crease.

The terms 43 can include specific terminology that is applicable to the context in which the OCR methodology is to be used. For example, for Boeing the terminology includes words related to aircraft and the airline industry. Other examples include words specific to the medical field, legal field, and telecommunications. The terms 43 are those that are expected to be encountered during the OCR process.

In one example, the control images 41 are actual documents that have been encountered in an environment. The actual documents are electronically scanned for use with this process. In another example, the control images 41 are created for use with this process.

Figure 3:
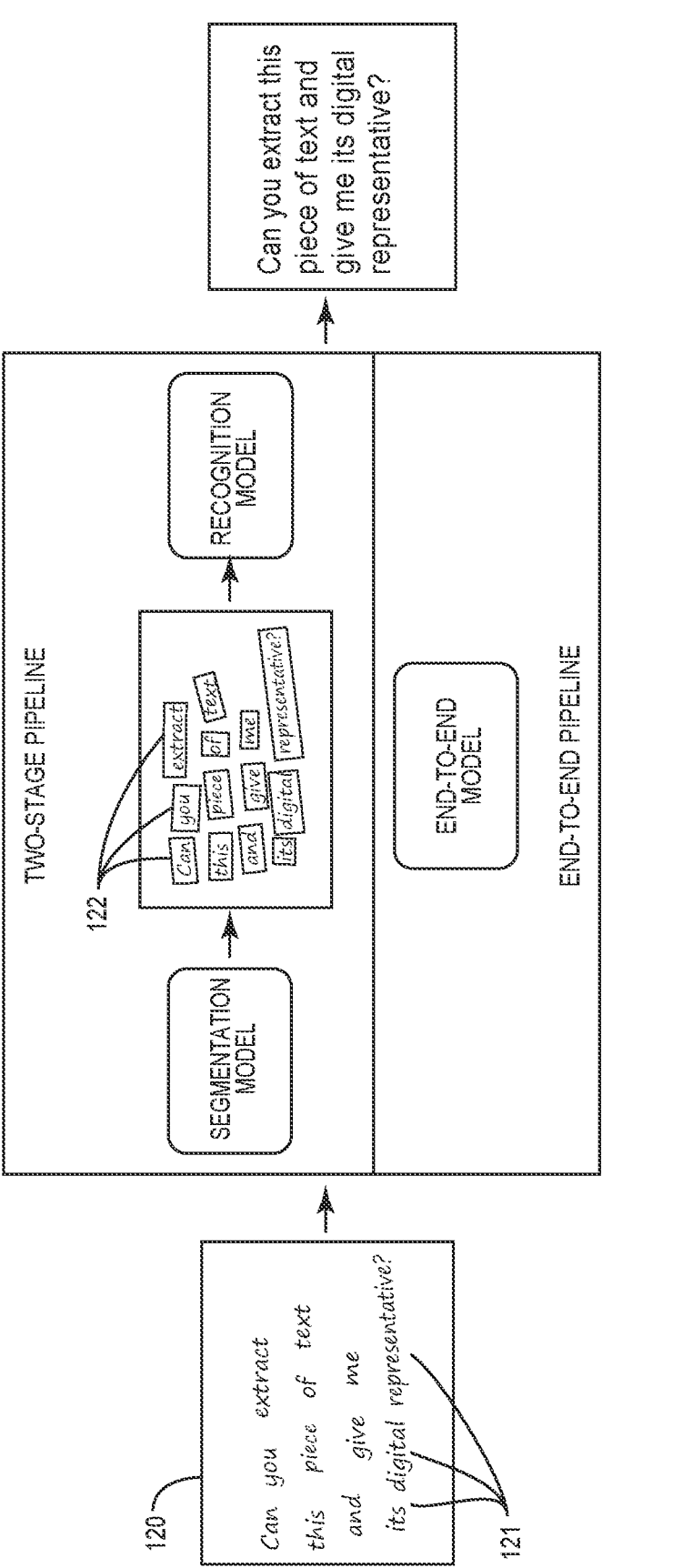
FIG. 3 is a schematic diagram of models for an optical character recognition process.

The base model 50 comprises software that identifies the individual characters 42. The base model 50 is configured to learn and then find and recognize text from the images of scanned documents. In one example, the base model 50 comprises three types of models to find and recognize text. As illustrated in FIG. 3, the base model 50 includes a segmentation model that searches for word-like objects 121 in an image 120. The base model 50 identifies the location of the objects 121 by fitting it within a bounding box 122. The base model 50 includes a recognition model that takes the images 121 of the particular words that were detected by the segmentation model and recognizes the content and produces a string of corresponding alphanumeric characters and symbols. The recognition model outputs for each word segment the location of the segment within the image 120 and the string in its digitized content. The base model 50 can include one or more of each of the recognition models and the segmentation models. Additionally or alternatively, the base model 50 includes an end-to-end model that combines the segmentation model and the recognition model in one step to recognizes the identified objects 121.

The base model 50 can express one or more weaknesses relating to the OCR process. A weakness can include the inability to identify a term 43 from an image. For example, the inability to identify handwritten terms. A weakness can also mean an effectiveness below a predetermined level. For example, the base model 50 can have an accuracy level of below 75% for identifying terms that appear within a graph. To address the one or more weaknesses in the base model 50, the computing device 100 selects one or more outside OCR models 60 (outside models 60) to test. If the testing is positive, the outside model 60 is incorporated into the base model 50 to create a new generation base model 50.

The outside models 60 can include various formats, including but not limited to open-source models and open-to-use models. In one example, an outside model is a mathematical algorithm that may or may not include associated software and which is openly-published and well-explained in a technical paper. The outside models 60 are software packages that function to perform one or more aspects of the OCR process. Examples of aspects that can be provided by an outside model 60 includes but are not limited to: identifying images from boxes, tables, etc.; identifying hand-written characters; and the reduction or elimination of the effects of artifacts such as noise, watermarks, line patterns from images. Examples of outside models 60 include but are not limited to Fast Oriented Text Spotting (FOTS), Efficient and Accurate Scene Text Detector (EAST), Multi-Object Rectified Attention Network for scene text recognition (MORAN), Character-Region Awareness for Text detection (CRAFT), and TESSERACT.

The selection of the outside model 60 can be based on one or more factors. These factors can include the ability to incorporate the outside model 60 with the base model 50. Examples of factors include: whether the outside model 60 describes/provides details for training and/or inference approaches; and whether the architecture of the outside model 60 is flexible to change based on mathematical and coding evaluations. Factors can be based on aspects of the ability to function using scanned images such as whether the outside model 60 would require significant changes to image-size, image-color, or text density, etc. Another factor for the selection is the technical capabilities of the outside model 60. Examples of technical features include but are not limited to: ability to process color, grayscale or B&W image types; ability for use with specific image types (e.g., images from specific camera, image size, aspect ratio); ability to detect text of same size-range in an image; ability to determine different text sizes in an image; ability to detect text in different orientations; detection of text from different angle of the camera/scanner; and detection of context specific items (e.g., tumor on a CT-scan, storm on a radar image, defect in a surface of a photographed object).

In one example, the outside model 60 is provided to the computing device 100. In another example, the computing device 100 accesses the outside model 60 through the network 110.

The evaluation (testing) of the outside models 60 uses control images 41 that are stored at the database 30. The control images 41 are labeled such that the correct aspects are known for each control image. For example, the number of words, the correct spelling of each word, the location of each word, etc. are known to provide for evaluating an effectiveness of the outside model 60. Further, the control images 41 include terms 43 (e.g., industry-specific terms) and document formats (e.g., graphs, letterhead) that will be encountered or expected to be encountered by the base model 50 during actual OCR processing.

Figure 4:
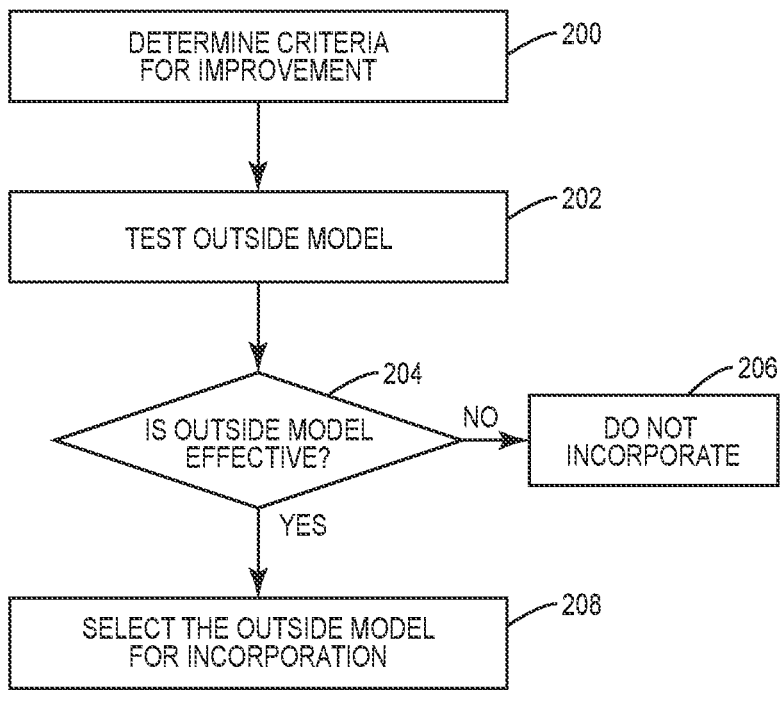
FIG. 4 is a flowchart diagram of a method of testing an outside model for incorporation into a base model.
Figure 5:
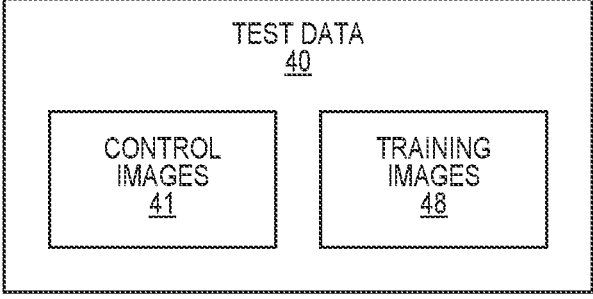
FIG. 5 is a schematic diagram of test data that comprises control images and training images.

FIG. 4 illustrates an overview of the process of creating a new generation of the OCR model 60. The process includes determining the criteria for improvement in the base model 50 (block 200). Examples of criteria include but are not limited to the identification of text in handwritten documents, documents with watermarks, capture rotated text, text from charts and graphs, and text from photographs.

The criteria can include adding a new ability to the OCR model and/or improving the target accuracy of the OCR model.

The outside model 60 is tested using the control images 41 (block 202) and the accuracy of the outside model 60 is determined (block 204). The process includes testing the outside model using the testing data. The use of the test data 40 provides for more accurately determining the effectiveness of the outside model 60 because the data is known. The results from the outside model 60 are compared to the known data to obtain an accurate indication of the effectiveness of the outside model 60. The test data 40 also includes industry specific terminology that provides an indication of the effectiveness of the outside model for use on documents containing similar language. The test data 40 also includes similar document types for which the outside model 60 will encounter such as handwritten documents, charts, photographs, etc.

If the accuracy is not acceptable, the outside model 60 is not incorporated into the base model 50 (block 206). If the accuracy is acceptable, the outside model 60 is selected for incorporation into the base model 50 (block 208). Once incorporated, the base model 50 and the incorporated outside model 60 create a new generation of the base model 50.

The effectiveness of the outside model 60 can be evaluated using different criteria. One criterion evaluates the word detection (or segmentation) accuracy by determining the proportion of terms 43 and/or characters 42 that are detected in each control image 41. The result can include a percentage of the number of terms 43 detected for each of the control images 41 compared to the number of known terms 43 in the control images 41. Another criterion determines a number or proportion of incorrectly-identified terms 43. Another criterion to determine the accuracy uses a Levenshtein distance which provides a number indicating the difference between two strings of characters 42. The detected terms 43 are compared to the known terms to determine this distance. Another criterion is a word-level recognition accuracy that determines an average of how many of the detected terms 43 were digitized correctly. The result can be a percentage of the number of terms 43 correctly digitized divided by the number of terms 43 detected in the control image 41. Another criterion is a character-level recognition accuracy that determines an average of how many characters 42 of a given term 43 word were digitized correctly. The result is calculated as a percentage.

The computing device 100 can determine the effectiveness of the outside model 60 based on one or more of these criteria. Additionally or alternatively, the effectiveness can analyze the amount of time necessary for the outside model 60 to analyze a predetermined number of control images 41.

When the testing determines that the outside model 60 is not effective, the outside model 60 is not incorporated. When the testing determines that the outside model 60 is effective, the outside model 60 is incorporated and a new generation base model 50 is created.

The generation of the new base model 50 occurs through model fusion which is an ensemble of the base model 50 and the outside model 60. The new base model 50 is an updated generation that includes one or more of the features of each of the base model 50 and the outside model 60. In one example, the incorporation includes transfer learning in which the existing knowledge and abilities of the base model 50 are maintained and improved by the outside model 60. The new capability of the outside model 60 is added to the base model 50. For example, the base model 50 is configured to recognize typed text and the outside model 60 is configured to identify logos. The new generation base model 50 combines these functionalities and is able to recognize both typed text and logos. In one example, the functionality of the outside model 60 addresses a weakness in the base model 50. In one specific example, the base model 50 provides the main functionality of the OCR process and the outside model 60 provides a specific aspect such as identification of terms 43 within a chart.

Transfer learning is advantageous because the result of the existing training of the base model 50 is maintained in the new generation model 50. It is not necessary to restart training of the new generation base model 50 from the beginning point. This advanced starting aspect of the transfer learning saves training time and training resources. The transfer learning takes the relevant parts of the pre-trained base model 50 and adds the functionality of the outside model 60.

The number of outside models 60 that are incorporated with the base model 50 can vary. In one example, a single outside model 60 is incorporated with the base model 50. Other examples include the incorporation of two or more outside models 60 with the base model 50. The different outside models 60 can be incorporated at one time, or at different times. In one example, different outside models 60 are incorporated when weaknesses are uncovered in the existing base model 50, during its exploitation.

In one example, the new generation base model 50 has different attributes than the previous generations of the base models 50. Each new generation starts with the exiting base model 50 and then adds new functionality and/or modifies the existing functionality and/or drops one or more features. For example, a new generation base model 50 can include the ability to capture rotated text and connected handwritten text. One or more features of can also be removed from a new generation base model 50.

In one example, the base model 50 can be trained using control images 41 to adapt to identify one or more new features. For example, the base model 50 can be trained to identify angled text.

The base model 50 includes a list of numeric coefficients that relate input to output. In one example, the input is an electronic document image and the output is a series of characters 42 and/or terms 43 extracted from the image. A simple (dummy) example of numeric coefficients is a one-dimensional (1D) array as shown below in List 1. These are coefficients of a mathematical function that forms the link between the input and the output.

| List 1 | | | | | | | |
|---|---|---|---|---|---|---|---|
| −6 | −10 | −37 | −98 | −13 | −68 | 2 | 84 |

To add a new feature (skill) to base model 50, the base model 50 is exposed to control images 41 that contain the feature (e.g., angled-text) that the base model 50 is trying to learn from. In a complete "loop", the base model 50 takes the control images 41 as inputs and outputs the results. The results are compared to the known results of the control images 41 and an estimate is computed between the output and the known results (referred to as "delta"). To make an estimate, a mathematical function (usually known as a "loss function") calculates the difference between the known results (which can be equated to a numeric or logic-based representation) and the results generated by the base model 50. This function is chosen for each base model 50 depending on the architecture of the model.

While the delta is above a predetermined delta (which is equivalent to being below a predetermined accuracy rate), additional training (looping) of the base model 50 occurs. Each additional loop may use the same or new control images 41 that include the feature. In one example, this additional training results in an improvement in the ability of the base model 50 to identify the feature in different settings (which means lower delta and higher accuracy). The updated abilities of the base model 50 is analyzed in each loop and an updated matrix is computed. One example is shown below as List 2. Note that these coefficients may not be able to be interpreted and one cannot tell what each coefficient or combination of coefficients means. The coefficients function to carry the characteristic of the newly trained base model 50 with a numerical representation.

| List 2 | | | | | | | |
|---|---|---|---|---|---|---|---|
| −72 | 9 | −24 | −35 | −52 | −75 | 1 | −81 |

This process continues until the base model 50 is determined to be acceptable because delta reaches a predetermined level.

In one example, the training of the base model 50 includes control images 41 with the feature being tested (i.e., angled text). Additionally or alternatively, the training can include control images 41 that include one or more additional features (e.g., a document with both horizontal and angled text). This ensures that the base model 50 is not drastically changed to adapt to only the one or more new features while losing effectiveness to identify other features.

In one example, the base model 50 is trained to remove a feature (skill). This occurs by training the base model 50 with control images 41 that do not include this feature and/or minimizes the feature.

In one example, the base model 50 is configured for "generalization". The base model 50 detects one or more features that have not been encountered during the training phase. For example, the training phase exposes the base model 50 to just 30-degree and 60-degree angled text in the control images 41, but the base model 50 is still able to detect a wider range of angled-text (e.g., angled-text from 20 to 80 degrees).

In the event the base model 50 is not effectively trained to identify the new feature, one or more outside models 60 are incorporated into the base model 50. The one or more outside models 60 are effective in the missing skill and thus the newly generated base model 50 is effective.

To combine/fuse the base model 50 and the outside model 60, various methodologies can be used. One method includes defining a software algorithm that causes the specific model 50, 60 to be called for the specific task. In one example, the software algorithm is referred to as a "gating" algorithm. For example, the algorithm calls the base model 50 to analyze a first feature of documents (e.g., horizontal text). The algorithm calls the outside model 60 to analyze a second feature (e.g., angled text). In this approach, input type (i.e., document type) required features and the capabilities of the base model 50 are known and very minimum variation is accepted. Another method takes results of other models and based on an appropriate "voting" system pronounces a single winner model or combined weighted winners. The voting system may use multiple criteria to evaluate each model dynamically in operation. A more advanced approach uses a sequential algorithm that searches multiple model environments (the input/output of models instead of features of each model) and finds the "best" set of winner models (known as "best" actions) in the steps from the beginning to the end of the process. This approach requires a separate learning/training process that leads into an overarching model. This new model provides a guideline (or simply speaking a look-up table) that provides the best sequence of models (action) for different situations (e.g., required feature, document complexity, etc.).

Figure 6:
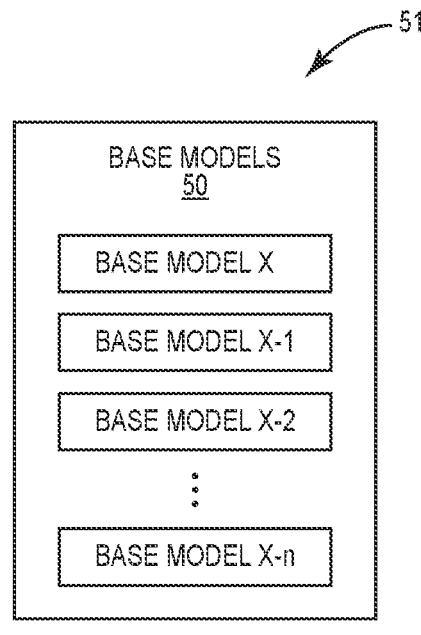
FIG. 6 is a schematic diagram of a family of base models.

The newly generated base model 50 is stored for use during the OCR process. In addition, previous generations of the base model 50 are also maintained and stored. As illustrated in FIG. 6, the base models 50 that are stored include the current base model x, as well as the previous generations of the base model x-1, x-2, . . . x-n. This inclusive storage method provides a family 51 of the progression of the various base models 50. The storage provides for maintaining a record of the generations and allows for the retrieval of the various base models 50 as needed. This storage also provides for industry standards which can require monitoring for an extended period after a base model 50 is retired. Without the storage of the family 51, hard data of actual training or sample data would need to be required in digital or hard copy. This type of storage is costly, inefficient, and requires continual maintenance. Conversely, storing a family 51 of the generations of base models 50 is relatively inexpensive. Further, a previous base model 50 can be accessed and used to provide OCR functionality compared to raw data that requires technical processing.

New generations of base models 50 can be created using the different generations of the base models 50. This provides for the functionality and training of the different base models 50 to be combined together to form the composite new base model 50. The different generations of base models 50 may include functionality that are better than others. This functionality can be utilized to generate the new base model 50 that would complement the existing models. The incorporation process can utilize the test data 40, such as the control images 41 that have known results to determine the effectiveness of the different generations of base models 50. A boosting algorithm can be used to determine the new base model 50 and combine it with the existing models. Examples of boosting algorithms that can be used include but are not limited to Adaptive Boosting, Gradient Tree Boosting, and XGBoost.

The computing device 100 can be any computing platform capable of analyzing the test data 40 according to the instructions of the base model 50 and/or the outside model 60. Examples of the computing device 100 include (but are not limited to) a server computer, a workstation, a personal computer, a network router, a network gateway, and/or a network access point. The network 20 includes one or more physical devices and/or signaling mediums capable of exchanging communication signals between the computing device 110, one or more remotes sources containing the outside models 60, and database 30 that stores the base models 50. Examples of such a network 20 include (but are not limited to) one or more signaling mediums; one or more in-vehicle networks (e.g., of an aircraft, spacecraft, rotorcraft, ship); one or more local area networks; one or more wireless networks; one or more Internet Protocol-based networks; one or more Ethernet networks; one or more optical networks; one or more ad hoc networks; and/or one or more electrical buses. Such a network 20 may comprise any number of networking devices such as routers, gateways, switches, hubs, firewalls, multiplexers, controllers, and the like (not shown), supporting the exchange of such communication signals.

Figure 7:
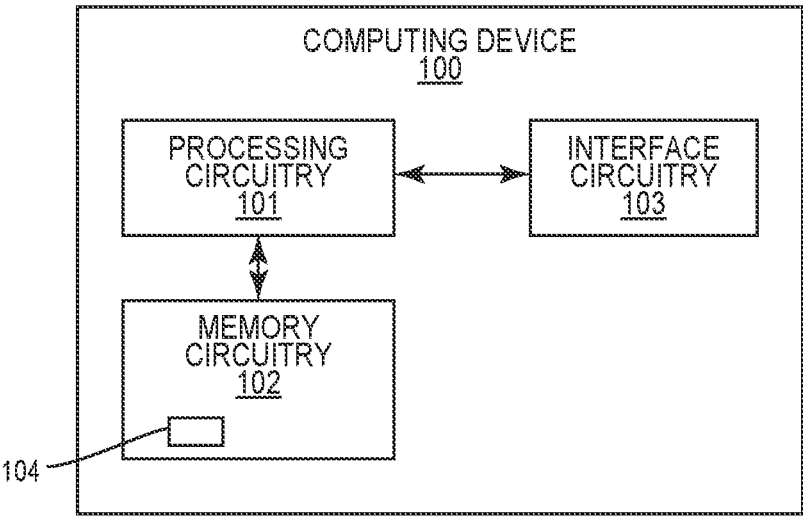
FIG. 7 is a schematic diagram of a computing device.

FIG. 7 illustrates a computing device 100 that includes processing circuitry 101 communicatively coupled via one or more buses to memory circuitry 102 and interface circuitry 103. According to various aspects, the processing circuitry 101 includes one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one example, the processing circuitry 101 includes programmable hardware capable of executing software instructions stored, e.g., as a machine-readable computer code 104 in the memory circuitry 102.

More particularly, the processing circuitry 101 is configured to execute the software instructions 104 to perform one or more of selecting an outside model 60, testing the outside model 60 on test data 40, determining an effectiveness of the outside model 60 relative to one or more criterion, and incorporating the outside model 60 into the base model 50 and generating a new base model 50.

Memory circuitry 102 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination.

Interface circuitry 103 comprises circuitry configured to control the input and output (I/O) data paths of the computing device 100. The I/O data paths include data paths for exchanging signals with other computers and mass storage devices over the communications network 20, and/or data paths for exchanging signals with the database 30. The interface circuitry 103 also provides for communications with one or more outside computing devices 25, either through the network 110 or other communications means.

Additionally, in some aspects of the present disclosure, interface circuitry 103 comprises input/output circuits and devices configured to allow a user to access information regarding the OCR process, the test data 40, the base models 50, the outside models 60, and the testing results. Such circuitry and devices include, but is not limited to, display devices such as a Liquid Crystal Display (LCD) and/or a Light Emitting Diode (LED) display for presenting visual information to a user, one or more graphics adapters, display ports, video buses, a touchscreen, a graphical processing unit (GPU), and audio output devices such as speakers. In some aspects of the present disclosure, interface circuitry 103 includes circuitry and devices for accepting input from a user. Such circuitry and devices include a pointing device (e.g., a mouse, stylus, touchpad, trackball, pointing stick, joystick), a microphone (e.g., for speech input), an optical sensor (e.g., for optical recognition of gestures), and/or a keyboard (e.g., for text entry).

In one example as illustrated in FIG. 1, the test data 40 and the base models 50 are stored in a database 30 that is remote from the computing device 100. In another example, some or all of the test data 40 and base models 50 are stored in the memory circuitry 102 at the computing device 100. In another example, some or all of the test data 40 and base models 50 are redundantly stored at two or more locations within the network environment 20 that are accessible to the computing device 100.

In one example, the computing device 100 obtains the test data 40 through the network 110. In another example, the computing device 100 obtains the test data 40 without going through the network 110. This alternate route provides for additional security with the test data 40 that can include proprietary information.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of testing an optical character recognition (OCR) model, the method comprising:

determining a criteria for improvement of an OCR base model;

establishing a communication link through a communications network;

downloading through the communications network an outside model that provides an OCR function;

obtaining test data comprising control images having predetermined alphanumeric data;

testing the outside model with the control images;

based on the testing, determining that the outside model increases the criteria of the base model; and selecting the outside model for incorporation with the OCR base model.

2. The method of claim 1, further comprising incorporating the outside model into the OCR base model and generating a new generation OCR base model.

3. The method of claim 2, wherein generating the new generation OCR base model comprises fusing together the OCR base model and the outside model and forming the new generation OCR model.

4. The method of claim 2, further comprising after generating the new generation OCR base model, maintaining the OCR base model.

5. The method of claim 4, further comprising maintaining a family that comprises the new generation OCR base model, the OCR base model, and one or more prior generations of OCR base model.

6. The method of claim 1, wherein testing the outside model comprises determining a number of words detected by the outside model in the test data relative to a known number of words in the control images.

7. The method of claim 1, wherein testing the outside model comprises:

determining a number of words detected by the outside model in the control images; and determining how many of the detected words were correctly digitized by the outside model.

8. The method of claim 1, further comprising selecting the outside model from a group of open-source models that are accessed through the communications network.

9. The method of claim 1, further comprising testing the outside model on the control images that comprise images of industry-specific documents.

10. The method of claim 1, wherein the OCR base model is configured to:

search and identify word images in an image document; and recognize the identified words and produce a string of corresponding alphanumeric characters.

11. The method of claim 1, wherein the criteria comprises at least one of:

identifying word images from tables in the control images;

identifying word images of from handwritten characters in the control images; and identifying terms in the control images that are covered by stains.

12. A computing device comprising:

interface circuitry configured to send and receive data through a communications network;

processing circuitry operatively coupled to the interface circuitry and configured to:

obtain an outside model through the communications network that provides an OCR function;

obtain test data that comprises control images with known OCR attributes;

test the outside model using the control images and determine a score;

when the score is below a predetermined level, determine that the outside model should not be incorporated into a OCR base model; and when the score is above a predetermined level, generate a new generation base model that comprises the outside model and a base model.

13. The computing device of claim 12, wherein the processing circuitry is configured to obtain the test data without accessing an IP network of the communications network.

14. The computing device of claim 12, wherein the processing circuitry is further configured to:

determine a weakness criterion for improvement of the OCR base model; and determine that the weakness criterion is improved by the outside model based on the score.

15. The computing device of claim 12, wherein the outside model is an open-source model.

16. The computing device of claim 12, wherein the processing circuitry is further configured to determine that the outside model improves a weakness criteria of the OCR base model.

17. The computing device of claim 16, wherein the weakness criteria comprises at least one of:

identifying word images from tables in the control images;

identifying word images of from handwritten characters in the control images; and identifying terms in the control images that are covered by stains.

18. The computing device of claim 12, wherein the processing circuitry is further configured to store a family comprising the OCR base model and previous generations of the OCR base model.

19. The non-transitory computer readable medium of claim 18, wherein the processing circuitry is further configured to determine a criterion for improvement of the OCR base model.

20. A non-transitory computer readable medium storing a computer program product for controlling a programmable computing device, the computer program product comprising software instructions that, when executed on processing circuitry of the programmable computing device, cause the processing circuitry to:

establish a communication link through a communications network;

download through the communications network an outside model that provides an OCR function;

obtain test data comprising control images having predetermined alphanumeric data;

test the outside model with the control images;

based on the testing, determine that the outside model improves at least one criteria of an OCR base model; and select the outside model for incorporation with the OCR base model.

\* \* \* \* \*